(12) United States Patent
Xin et al.

(10) Patent No.: US 10,470,165 B2
(45) Date of Patent: Nov. 5, 2019

(54) CHANNEL WIDTH INDICATION IN EDMG CAPABILITIES AND EDMG OPERATIONS ELEMENTS IN 802.11AY

(71) Applicants: Yan Xin, Ottawa (CA); Sheng Sun, Ottawa (CA); Osama Aboul-Magd, Ottawa (CA); Kwok Shum Au, Ottawa (CA)

(72) Inventors: Yan Xin, Ottawa (CA); Sheng Sun, Ottawa (CA); Osama Aboul-Magd, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 15/683,088

(22) Filed: Aug. 22, 2017

(65) Prior Publication Data

US 2018/0242299 A1 Aug. 23, 2018

Related U.S. Application Data

(60) Provisional application No. 62/460,139, filed on Feb. 17, 2017.

(51) Int. Cl.
*H04W 72/04* (2009.01)
*H04L 29/08* (2006.01)
(Continued)

(52) U.S. Cl.
CPC ......... *H04W 72/0406* (2013.01); *H04L 5/001* (2013.01); *H04L 5/0092* (2013.01);
(Continued)

(58) Field of Classification Search
CPC .......... H04W 72/0406; H04W 74/002; H04W 84/12; H04L 69/324
See application file for complete search history.

(56) References Cited

U.S. PATENT DOCUMENTS

| 2016/0309457 A1 | 10/2016 | Eitan et al. | |
| 2017/0201992 A1* | 7/2017 | Cordeiro | H04W 40/244 |
| 2018/0255537 A1* | 9/2018 | Park | H04W 72/044 |

FOREIGN PATENT DOCUMENTS

| WO | 2016145939 A1 | 9/2016 |
| WO | 2016170505 A1 | 10/2016 |

OTHER PUBLICATIONS

U.S. Appl. No. 15/661,508, "Methods and Systems for Transmitting Operating Channel Indicators", filed Jul. 27, 2017.
(Continued)

*Primary Examiner* — Nam T Huynh

(57) ABSTRACT

Methods for communicating support of operations or capabilities for enhanced directional multi-gigabit (EDMG) communications are described. A supported channel width field or operating channel width field is used in a capabilities element or operation element. The supported channel width field or operating channel width field includes bit positions with bit values that are set to indicate support of operation or a capability of the transmit device from among defined options, the defined options including: the transmit device can perform channel bonding only, the transmit device can perform carrier aggregation only, and the transmit device can perform both channel bonding and carrier aggregation.

18 Claims, 14 Drawing Sheets

(51) Int. Cl.
*H04L 5/00* (2006.01)
*H04L 27/26* (2006.01)
*H04W 84/12* (2009.01)
*H04W 74/00* (2009.01)
*H04W 8/24* (2009.01)

(52) U.S. Cl.
CPC ........ *H04L 27/2602* (2013.01); *H04L 69/324* (2013.01); *H04W 8/24* (2013.01); *H04W 74/002* (2013.01); *H04W 84/12* (2013.01)

(56) References Cited

OTHER PUBLICATIONS

IEEE Std 802.11™-2016, "IEEE Standard for Information Technology—Telecommunications and information exchange between systems Local and metropolitan area networks—Part 11: Wireless LAN Medium Access Control (MAC) and Physical Layer (PHY) Specifications", section 9.4.2.9 Country Element, pp. 795-798.

IEEE Std 802.11™-2016, "IEEE Standard for Information Technology—Telecommunications and information exchange between systems Local and metropolitan area networks—Part 11: Wireless LAN Medium Access Control (MAC) and Physical Layer (PHY) Specifications", Annex E Country Elements and Operating Classes, pp. 3275-3292.

Draft P802.11ay™ D0.1, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", section 9.4.2.250 EDMG Capabilities Element, pp. 19-22.

Draft P802.11ay™ D0.1, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", section 9.4.2.251 EDMG Operation Element, p. 23.

\* cited by examiner

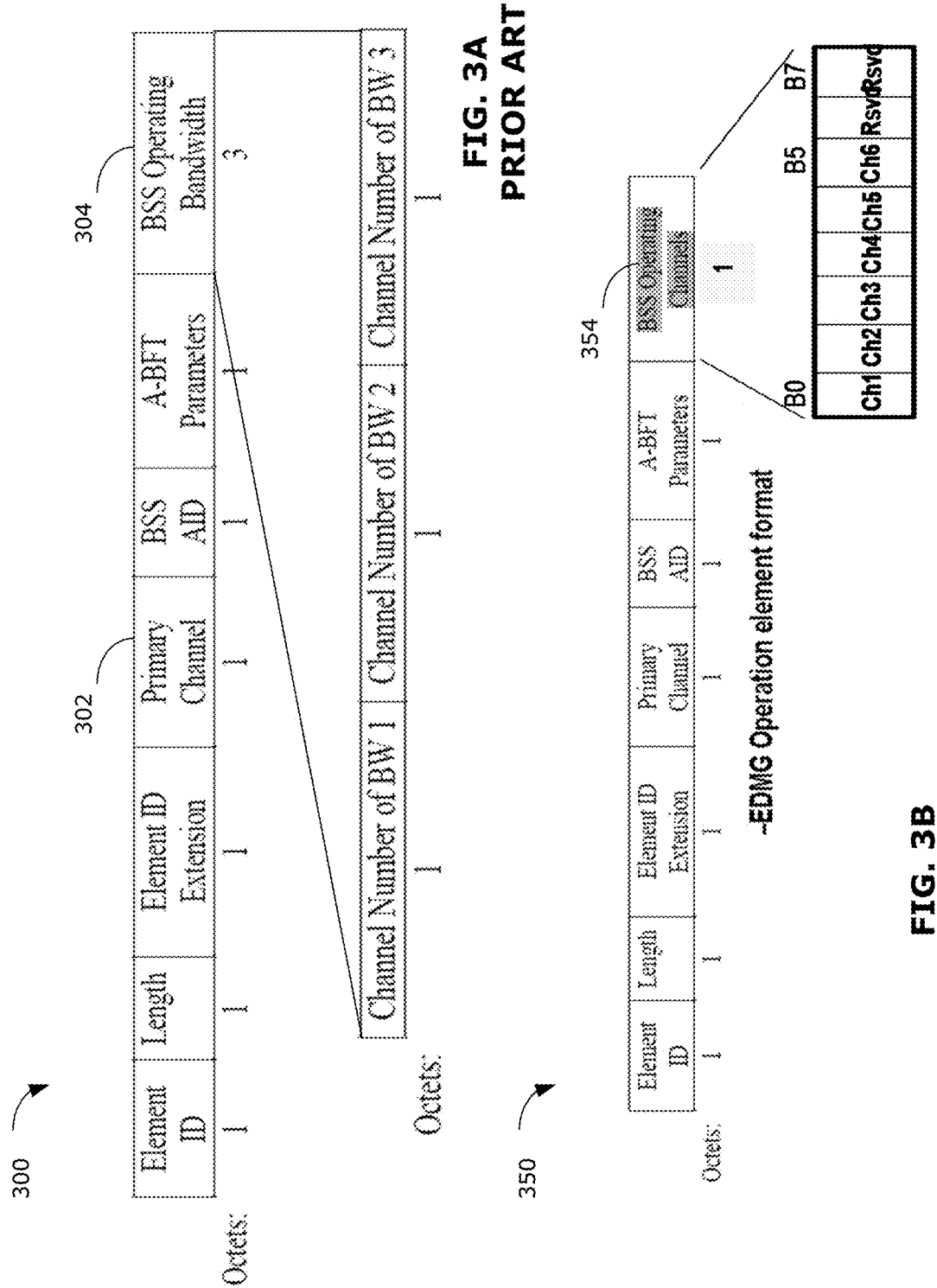

FIG. 4A
PRIOR ART

Figure 9-130—Country element format

FIG. 4B
PRIOR ART

| Supported Channel Width field | | Supported single channel, channel bonding and channel aggregation operations | | | | | |
|---|---|---|---|---|---|---|---|
| | | Single Channel/Channel Bonding | | | | Channel Aggregation | |
| B0 B1 | B2 B3 | 2.16 GHz | 4.32 GHz | 6.48 GHz | 8.64 GHz | 2.16+2.16 GHz | 4.32+4.32 GHz |
| 00 (support single channel / channel bonding only) | 00 | 1 | - | - | - | - | - |
| | 01 | 1 | 1 | - | - | - | - |
| | 10 | 1 | 1 | 1 | - | - | - |
| | 11 | - | 1 | 1 | 1 | - | - |
| 01 (support channel aggregation only) | 00 | - | - | - | - | 1 | - |
| | 01 | - | - | - | - | 1 | - |
| | 10 | - | - | - | - | 1 | 1 |
| | 11 | - | - | - | - | 1 | 1 |
| 10 (support both single channel / channel bonding and channel aggregation) | 00 | 1 | - | - | - | 1 | - |
| | 01 | 1 | 1 | - | - | 1 | - |
| | 10 | 1 | 1 | 1 | - | 1 | 1 |
| | 11 | 1 | 1 | 1 | 1 | 1 | 1 |
| 11 (support both single channel / channel bonding and channel aggregation) | 00 | 1 | - | - | - | 1 | 1 |
| | 01 | 1 | 1 | - | - | 1 | 1 |
| | 10 | 1 | 1 | 1 | - | 1 | 1 |
| | 11 | 1 | 1 | 1 | 1 | 1 | 1 |

FIG. 5

| Supported Channel Width field | | |
|---|---|---|
| Channel Bonding Indication | Channel Width Indication for Channel Bonding | Channel Aggregation Indication | Channel Width Indication for Channel Aggregation |
| B0 | B1 B2 | B3 | B4 |

FIG. 9

| Channel BW Configuration subfield value | | Supported single channel, channel bonding and channel aggregation operations | | | | | |
|---|---|---|---|---|---|---|---|
| | | Single channel/Channel bonding | | | | Channel aggregation | |
| B0 B1 | B2 B3 | 2.16 GHz (primary channel) | 4.32 GHz | 6.48 GHz | 8.64 GHz | 2.16+2.16 GHz | 4.32+4.32 GHz |
| 00 | Reserved | | | | | | |
| 01 (operating on single channel and channel bonding only) | 00 | 1 | | | | | |
| | 01 | 1 | 1 | | | | |
| | 10 | 1 | 1 | 1 | | | |
| | 11 | 1 | 1 | 1 | 1 | | |
| 10 (operating on single channel, channel bonding and 2.16+2.16 GHz channel aggregation) | 00 | 1 | | | | 1 | |
| | 01 | 1 | 1 | | | 1 | |
| | 10 | 1 | 1 | 1 | | 1 | |
| | 11 | 1 | 1 | 1 | 1 | 1 | |
| 11 (operating on single channel, channel bonding and 4.32+4.32 GHz channel aggregation) | 00 | 1 | | | | 1 | 1 |
| | 01 | 1 | 1 | | | 1 | 1 |
| | 10 | 1 | 1 | 1 | | 1 | 1 |
| | 11 | 1 | 1 | 1 | 1 | 1 | 1 |

FIG. 13

CHANNEL WIDTH INDICATION IN EDMG CAPABILITIES AND EDMG OPERATIONS ELEMENTS IN 802.11AY

CROSS-REFERENCE TO RELATED APPLICATIONS

The present disclosure claims priority from U.S. provisional patent application No. 62/460,139, filed Feb. 17, 2017, the entirety of which is hereby incorporated by reference.

FIELD

The present disclosure relates to enhanced directional multi-gigabit (EDMG) communications, in particular methods and systems for communicating EDMG capabilities, including channel bonding and carrier aggregation and channel width capabilities, and EDMG operation, including operations of channel bonding and carrier aggregation and channel width.

BACKGROUND

IEEE 802.11ay is the next generation of IEEE 802.11ad. IEEE 802.11ad enables directional multi-gigabit (DMG) communications, and IEEE 802.11ay introduces enhanced DMG (EDMG). Both DMG and EDMG operate on the 60 GHz unlicensed spectrum. IEEE 802.11ay can achieve up to 20 Gbps throughput with introduction of channel bonding, channel aggregation, and multiple-input multiple-output (MIMO) technologies.

Generally, in IEEE 802.11ad and IEEE 802.11ay, a wireless device, also referred to as an access point (AP), a personal basic service set (PBSS) or a station (STA), may indicate its support of capabilities to the network by transmitting a Capabilities Element in Association Request, Association Response, Reassociation Request, Reassociation Response, Probe Request and/or Probe Response frames, and/or in DMG Beacon and Information request and response frames. In IEEE 802.11n (which provides high-throughput (HT)) and IEEE 802.11ac (which provides very high-throughput (VHT)), the Capability Information field in the Capability Element includes a Supported Channel Width Set field (which is 1 bit in HT; and 2 bits in VHT), by which a STA declares its channel width capability.

Channelization used by EDMG STAs is proposed for IEEE 802.11ay, in which the maximum number of 2.16 GHz channels to be bonded is 4 (maximum channel width is 8.64 GHz). Also as proposed, EDMG supports two types of carrier aggregation: namely 1) 2.16 GHz+2.16 GHz; and 2) 4.32 GHz+4.32 GHz. Improvements to the Capability element and Operations element would be desirable to enable the PCP/AP and STA to communicate their capabilities for EDMG communications, including information for channel bonding and carrier aggregation.

SUMMARY

The present disclosure describes example approaches that enable a transmitting device (e.g., an AP/PCP or STA) to communicate its capabilities or operation for channel bonding and/or carrier aggregation within a Capabilities element or Operations element, respectively. By including a Supported Channel Width field in the Capabilities element or Operations element, such EDMG capabilities and EDMG operations may be clearly and explicitly indicated.

In some aspects, the present disclosure describes a method for communicating support of operations for EDMG. The method includes transmitting, by a transmitting device, an operation element including an operating channel width field. The operating channel width field includes bit positions, bit values of the bit positions being set to indicate support of operation of the transmit device from among defined options, the defined options including: the transmitting device can perform channel bonding only, the transmit device can perform carrier aggregation only, and the transmit device can perform both channel bonding and carrier aggregation.

In some embodiments of any of the preceding aspects/embodiments, the operating channel width field includes a supported channel width field, the supported channel width field including the bit positions.

In some aspects, the present disclosure describes a method for communicating capabilities for EDMG communications. The method includes transmitting, by a transmitting device, a capabilities element including a supported channel width field. The supported channel width field includes bit positions, bit values of the bit positions being set to indicate a capability of the transmit device from among defined options, the defined options including: the transmitting device can perform channel bonding only, the transmit device can perform carrier aggregation only, and the transmit device can perform both channel bonding and carrier aggregation.

In some embodiments of the previous aspect, the capabilities element further includes a supported channel bitmap field for indicating one or more supported channels for EDMG communications.

In some embodiments of any of the preceding aspects/embodiments, the supported channel bitmap field indicates capability of the transmitting device to operate in each one of a plurality of channels in a regulatory domain.

In some embodiments of any of the preceding aspects/embodiments, the supported channel width field is 4 bits long. Bit values of 2 bits are set to indicate the support of operation or capability of the transmitting device from among the defined options, and bit values of another 2 bits are set to indicate the respective channel width of one or more supported channels.

In some embodiments of any of the preceding aspects/embodiments, the supported channel width field is 5 bits long. Bit value of a first bit is set to indicate whether the transmitting device supports or has channel bonding capability and bit value of a second bit is separately set to indicate whether the transmitting device supports or has carrier aggregation capability. Bit value of another pair of bits is set to indicate channel width for channel bonding and bit value of a third bit is set to indicate channel width for carrier aggregation.

In other aspects, the present disclosure describes an apparatus for enhanced directional multi-gigabit (EDMG) communications. The apparatus includes a memory, a transceiver for EDMG communications and a processing unit. The processing unit is configured to execute instructions stored in the memory to cause the apparatus to perform any of the methods described above.

BRIEF DESCRIPTION OF FIGURES

Reference will now be made, by way of example, to the accompanying drawings which show example embodiments of the present application, and in which:

FIG. 3A shows the format of a prior art operations element;

FIG. 3B shows the format of an operations element disclosed in U.S. provisional patent application No. 62/444,118, filed Jan. 9, 2017;

FIG. 4A shows the format of a prior art Country element;

FIG. 4B shows an example operating class for the Country element of FIG. 4A;

FIG. 5 is a table illustrating how an example 4 bit Supported Channel Width field may be used to indicate EDMG capabilities and EDMG operations;

FIG. 9 is a table illustrating how an example 5 bit Supported Channel Width field may be used to indicate EDMG capabilities and EDMG operations;

FIG. 13 is another table illustrating how an example 4 bit Supported Channel Width field may be used to indicate EDMG capabilities.

Similar reference numerals may have been used in different figures to denote similar components.

DETAILED DESCRIPTION

In examples described below, the present disclosure enables Supported Channel Width indication in EDMG Capabilities element and EDMG Operation element. Examples described herein may remove the ambiguity of channel bonding and channel aggregation features, compared to the conventional approach where only bitmap on supported channels is defined. The methods described herein may be implemented by any suitable wireless communication device, for EDMG communications in a wireless network.

Figure 1A:
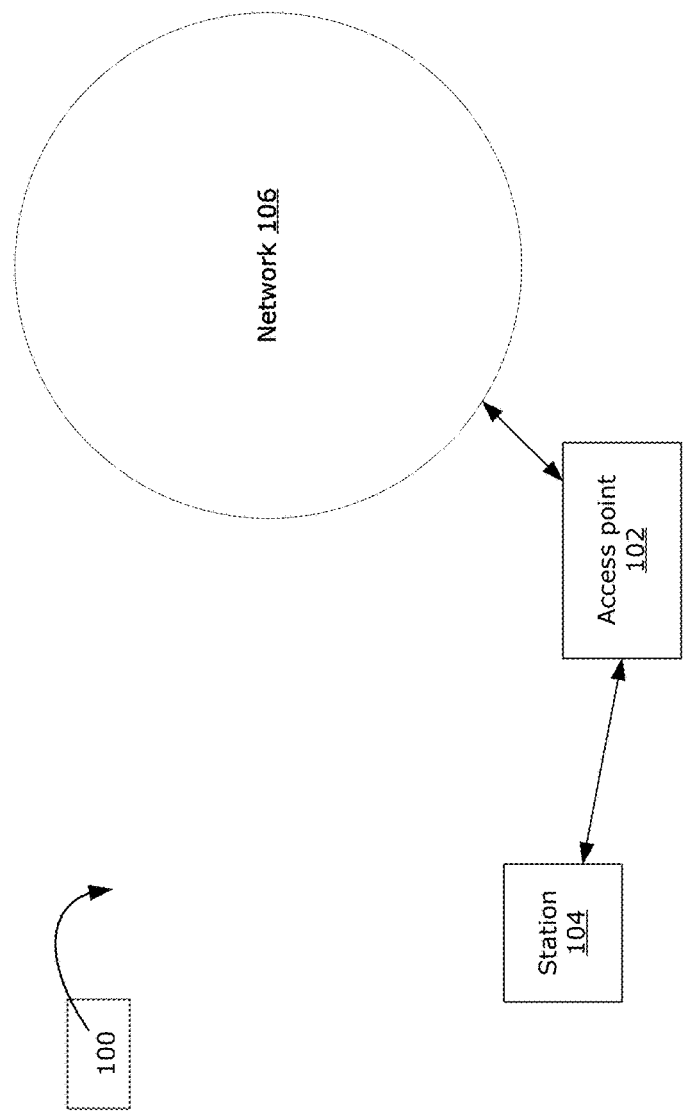
FIG. 1A is a schematic diagram illustrating an example system for EDMG communications between a STA and the network.

FIG. 1A is a schematic diagram of an example system 100 in which methods described herein may be implemented. The system 100 shown in FIG. 1 is a wireless local area network (WLAN) including an access point (AP) 102 and multiple stations (STAs) 104 within coverage (indicated by dotted line) of the AP 102. In the example shown, there is only one STA 104 shown, however there may be multiple STAs 104. Each STA 104 may be any suitable device capable of wireless communication, including mobile or stationary devices such as smartphones, laptops, mobile phones or tablet devices, for example, and the STAs 104 need not be the same as each other. The STAs 104 may also be referred to as terminals, user devices, user equipment (UE) or clients, for example. The AP 102 may be also referred to as a personal basic service set (PBSS) coordinate point (PCP) or a base station. The AP 102 may be implemented as a router, for example. The STA 104 may access a network 106 via the AP 102.

The system 100 may support communication between the AP 102 and each STA 104, as well as communication directly between STAs 104 (also referred to as device-to-device communication). Using directional antennas, the AP 102 may carry out multi-user transmissions (e.g., transmissions from the AP 102 to multiple STAs 104 simultaneously) by using the spatial reuse technique of MU-MIMO.

Figure 1B:
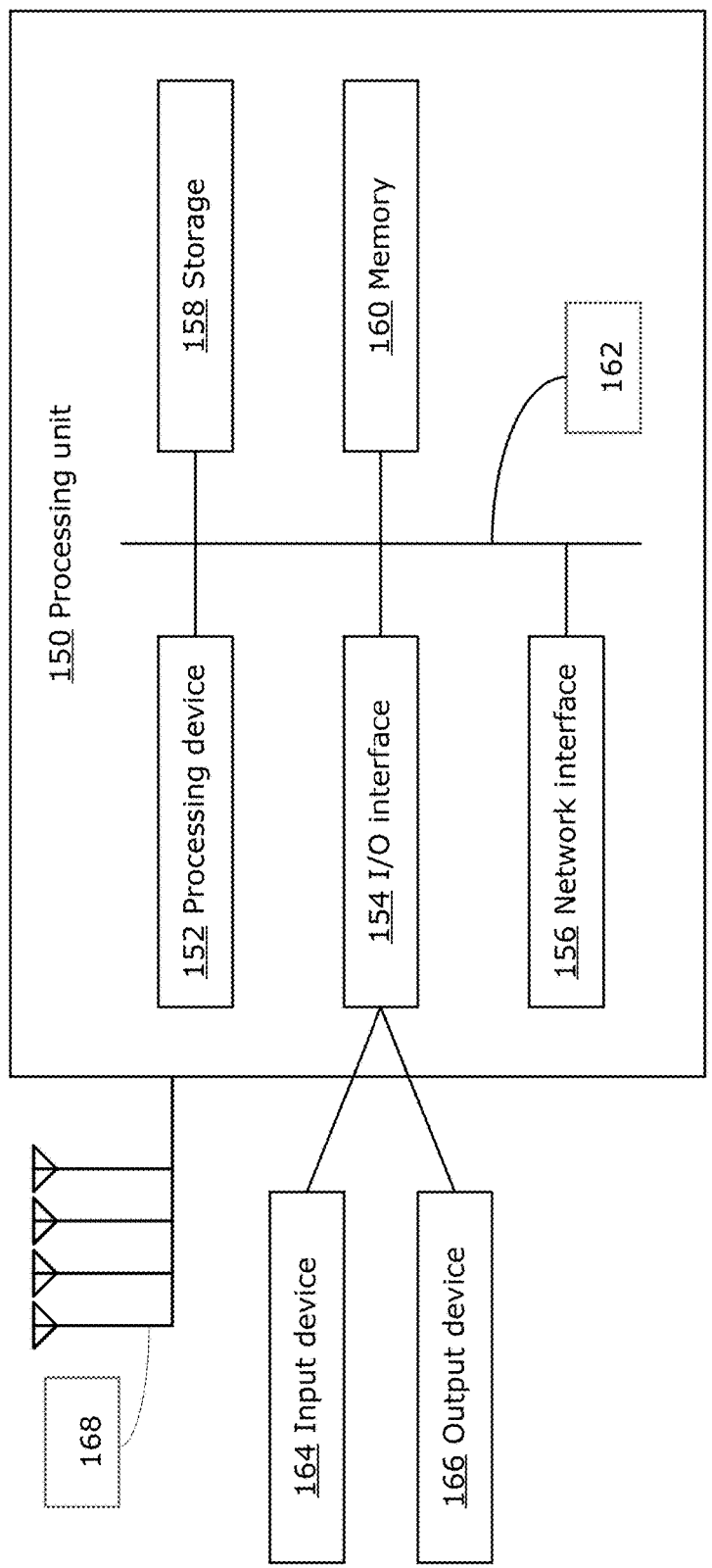
FIG. 1B is a block diagram illustrating an example device suitable for EDMG communications.

FIG. 1B is a block diagram illustrating an example processing unit 150, which may be used to implement the methods and systems disclosed herein, for example the AP 102 and/or one or more of the STAs 104. Other processing units suitable for implementing the present disclosure may be used, which may include components different from those discussed below. Although FIG. 1B shows a single instance of each component, there may be multiple instances of each component in the processing unit 150.

The processing unit 150 includes one or more processing devices 152, such as a processor, a microprocessor, an application-specific integrated circuit (ASIC), a field-programmable gate array (FPGA), a dedicated logic circuitry, or combinations thereof. The processing unit 150 may also include one or more input/output (I/O) interfaces 154, which may enable interfacing with one or more appropriate input devices 164 and/or output devices 166. The processing unit 150 includes one or more network interfaces 156 for wired or wireless communication with the network 106 (e.g., an intranet, the Internet, a P2P network, a WAN, a LAN, and/or a Radio Access Network (RAN)). The network interface(s) 156 may include wired links (e.g., Ethernet cable) and/or wireless links for intra-network and/or inter-network communications. The network interface(s) 156 may provide wireless communication via one or more transmitters/receivers or transceiver antennas 168, for example. The antennas 168 may act together as an antenna array, in which case each antenna 168 may be referred to as an antenna element or radiating element of the antenna array. There may be a plurality of such antenna arrays. The processing unit 150 may also include one or more storage units 158, which may include a mass storage unit such as a solid state drive, a hard disk drive, a magnetic disk drive and/or an optical disk drive.

The processing unit 150 may include one or more memories 160, which may include a volatile or non-volatile memory (e.g., a flash memory, a random access memory (RAM), and/or a read-only memory (ROM)). The non-transitory memory(ies) 160 may store instructions (e.g., in the form of software modules) for execution by the processing device(s) 152, such as to carry out the methods described in the present disclosure. The memory(ies) 160 may include other software instructions, such as for implementing an operating system and other applications/functions. In some examples, one or more data sets and/or module(s) may be provided by an external memory (e.g., an external drive in wired or wireless communication with the processing unit 150) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 162 providing communication among components of the processing unit 150, including the processing device(s) 152, I/O interface(s) 154, network interface(s) 156, storage unit(s) 158 and/or memory(ies) 160. The bus 162 may be any suitable bus architecture including, for example, a memory bus, a peripheral bus or a video bus.

In FIG. 1B, the input device(s) 164 (e.g., a keyboard, a mouse, a microphone, a touchscreen, and/or a keypad) and output device(s) 166 (e.g., a display, a speaker and/or a printer) are shown as external to the processing unit 150. In other examples, one or more of the input device(s) 164 and/or the output device(s) 166 may be included as a component of the processing unit 150. In other examples, there may not be any input device(s) 164 and output device(s) 166, in which case the I/O interface(s) 154 may not be needed.

The AP 102 and STAs 104 may each include multiple antenna elements 168 forming antenna arrays, and may carry out appropriate beamforming and beam steering controls (e.g., using beamsteering circuits and/or beamsteering control modules implemented by the processing device 152 and processing unit 150), in order to carry out directional wireless communication, including directional multi-gigabit (DMG) and enhanced DMG (EDMG) communications.

Figure 2:
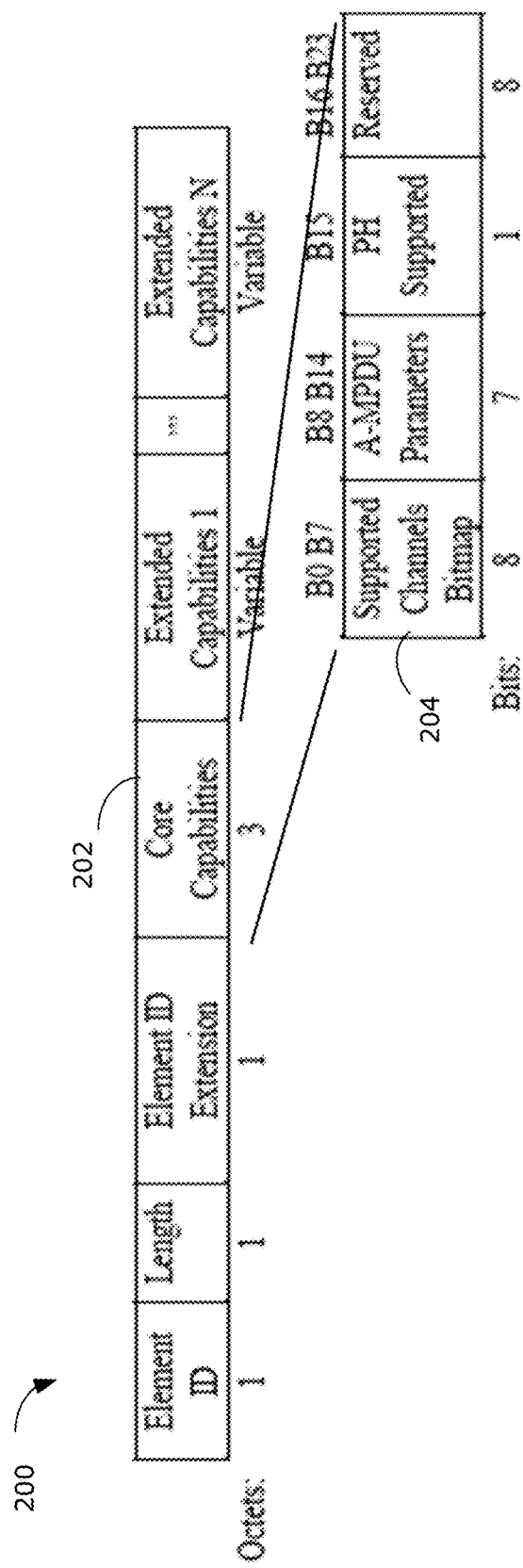
FIG. 2 shows the format of a prior art capabilities element.

In IEEE 802.11ay D0.1, the conventional EDMG Capabilities Element 200 is defined as shown in FIG. 2. The Core Capability field 202 includes a Supported Channels Bitmap field 204 (using 8 bits), in which bit values of "1" and "0" indicate whether the channel is supported or not, respectively. However, this bitmap indication in the conventional EDMG Capabilities element is not able to provide full information on the STA's capabilities related to channel bonding and/or channel aggregation. For example, though the Supported Channels Bitmap field 204 may indicate support of two consecutive 2.16 GHz channels, there is no way to distinguish whether there is channel bonding (4.32 GHz) or carrier aggregation (2.16 GHz+2.16 GHz). In the present disclosure, an improved capabilities element is described further below, which may address this and/or other drawbacks of the conventional capabilities element 200.

In IEEE 802.11ay D0.1, the conventional EDMG Operation element 300 is defined as shown in FIG. 3A. Together with the primary channel field 302, the BSS Operating Bandwidth field 304 specifies the bandwidth that Physical Layer Convergence Procedure (PLPC) Protocol Data Unit (PPDU) transmissions in the Basic Service Set (BSS) are allowed to occupy. The conventional BSS Operating Bandwidth field 304 is formatted as shown in FIG. 3A.

However, the 3-byte BSS Operating Bandwidth field 304 defined in IEEE 802.11ay D0.1 can support BSS operations only up to 3 different types of channel bonding or channel aggregation. A previous patent application, U.S. provisional patent application No. 62/444,118, filed Jan. 9, 2017 and incorporated herein by reference in its entirety, describes an Operations element 350 (shown in FIG. 3B) in which the format of the BSS Operating Bandwidth field 304 in the conventional Operations field 300 is replaced with a EDMG Operating Channels field 354, in which the BSS Operating Channels field 354 uses a bitmap to indicate the operating channels. However, as described with respect to the conventional Capabilities element 200, it may be desirable to further modify this field to include channel width information (e.g., channel width for channel bonding and/or channel aggregation).

In IEEE 802.11ad, section 10.21.2, a STA 104 is capable of operating on channels across regulatory domain. As described in the standard: "[t]he DMG Beacon or Announce frame transmitted by DMG STAs contains information on the country code, the maximum allowable transmit power, and the channels that may be used for the regulatory domain." Optionally, the DMG Beacon or Announce frame may include a Country element. The Country element includes information to allow a STA 104 to identify the regulatory domain in which the STA 104 is located and to configure its physical layer (PHY) for operation in that regulatory domain. The Country element format 400 is specified in section 9.4.2.9 of IEEE 802.11 and shown in FIG. 4A. There may be multiple instances of the Triplet field 402. Each instance of the Triplet fields 402 contains a First Channel Number field, Number of Channels field and Maximum Transmit Power Level field (not shown). The Operating Class field (which is in Request and Action Frames) indicates an operating class value defined in Annex E of IEEE 802.11. The operating class is interpreted in the context of the country specified in the Beacon frame. For example, operating class in the 60 GHz band in the United States is defined as shown in FIG. 4B.

In examples described herein, a Supported Channel Width field is described, to provide indication of EDMG capabilities and EDMG operations. In particular, a 4 bit long Supported Channel Width field and a 5 bit long Supported Channel Width field are described. It should be understood that there are presented as examples only, and other formats and bit lengths of the Supported Channel Width field may be used to convey the same information. The Supported Channel Width field may be implemented in a Capabilities element or Operation element, and transmitted as a beacon by a transmitting device (e.g., an AP 102 or STA 104) to communicate the capabilities of the transmitting device or other management frames.

In some examples, the Supported Channel Width field may be 4 bits long. FIG. 5 is a table illustrating how the 4 bits of the example Supported Channel Width field may be used to indicate EDMG capabilities of an AP 102 or a STA 104. In supported channel bonding/channel aggregation operations in the table of FIG. 5, an entry of "1" denotes the channel width supported; and "-" denotes the channel width not supported. As shown in FIG. 5, the first 2 bits of the Supported Channel Width field may be used to indicate whether the AP 102 or STA 104 supports single channel/channel bonding only, supports channel aggregation only, or supports both single channel/channel bonding as well as channel aggregation. The last 2 bits of the Support Channel width field may be used to indicate which channel(s) (if any) is(are) supported for channel bonding (or a single channel), and what channel aggregation (if any) is supported. The last 2 bits of the Support Channel width field may indicate the respective width(s) of the supported channel(s).

Figure 6:
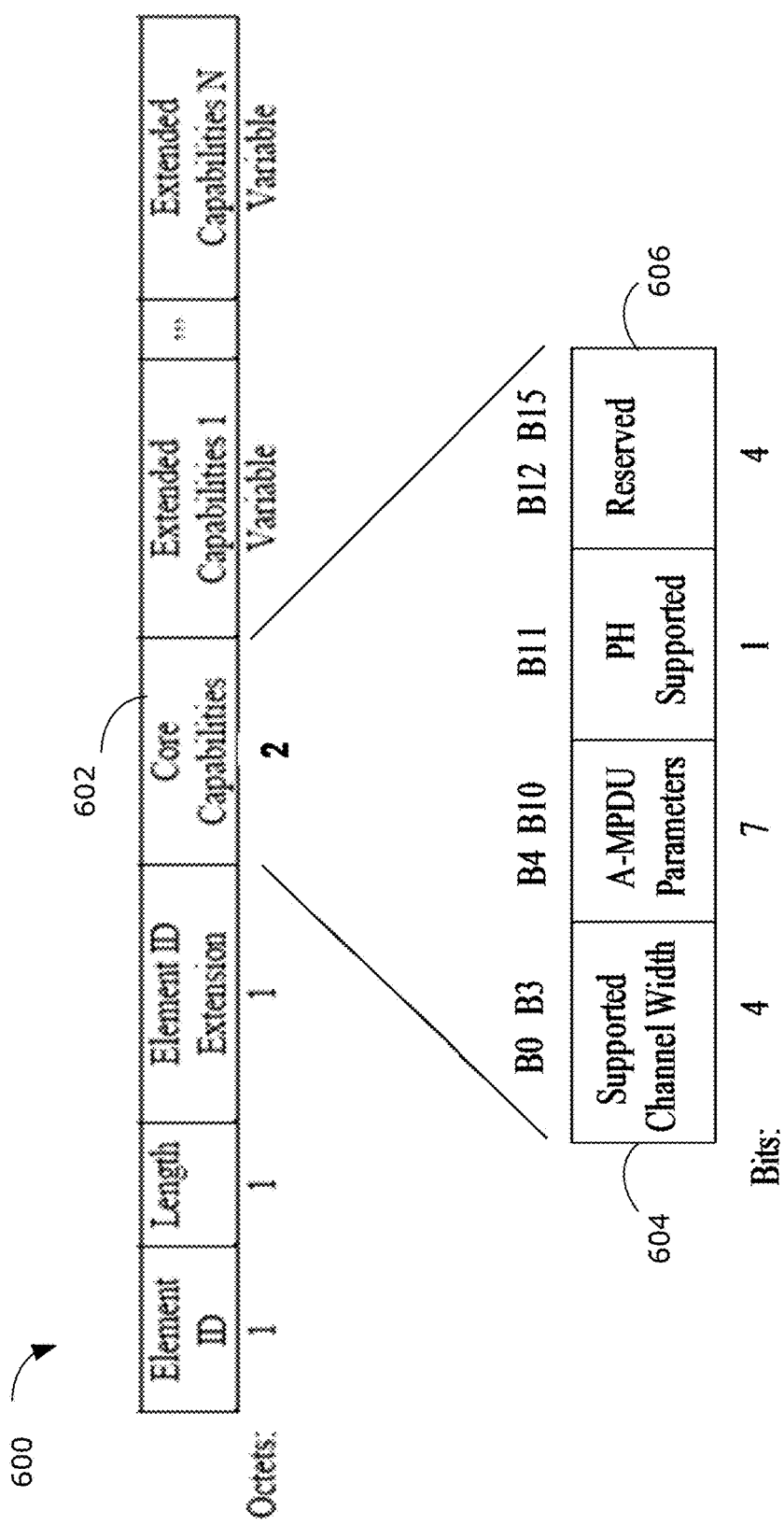
FIG. 6 shows the format of an example Capabilities element implementing a 4 bit Supported Channel Width field.

FIG. 6 illustrates how a 4 bit Support Channel Width field may be implemented in an example EDMG Capabilities element 600. In this example Capabilities element 600, the Core Capabilities field 602 is only 2 octets long, which is shorter than in the conventional Capabilities field 200 (see FIG. 2). This shorter field may result in greater efficiencies. The disclosed Core Capabilities field 602 includes a Supported Channel Width field 604 in place of the Supported Channels Bitmap 204. The Supported Channel Width field 604 may be only 4 bits long (e.g., as described with reference to FIG. 5 above), which is shorter than the Supported Channels Bitmap 204. Further, the Reserved field 606 in the disclosed Core Capabilities field 602 may be only 4 bits long, which is shorter than in the conventional Core Capabilities field 202. The other fields of the disclosed Core Capabilities field 602 may be the same as in the conventional Core Capabilities field 202. Other fields of the disclosed Capabilities element 600 may be the same as the conventional Capabilities element 200.

Figure 7:
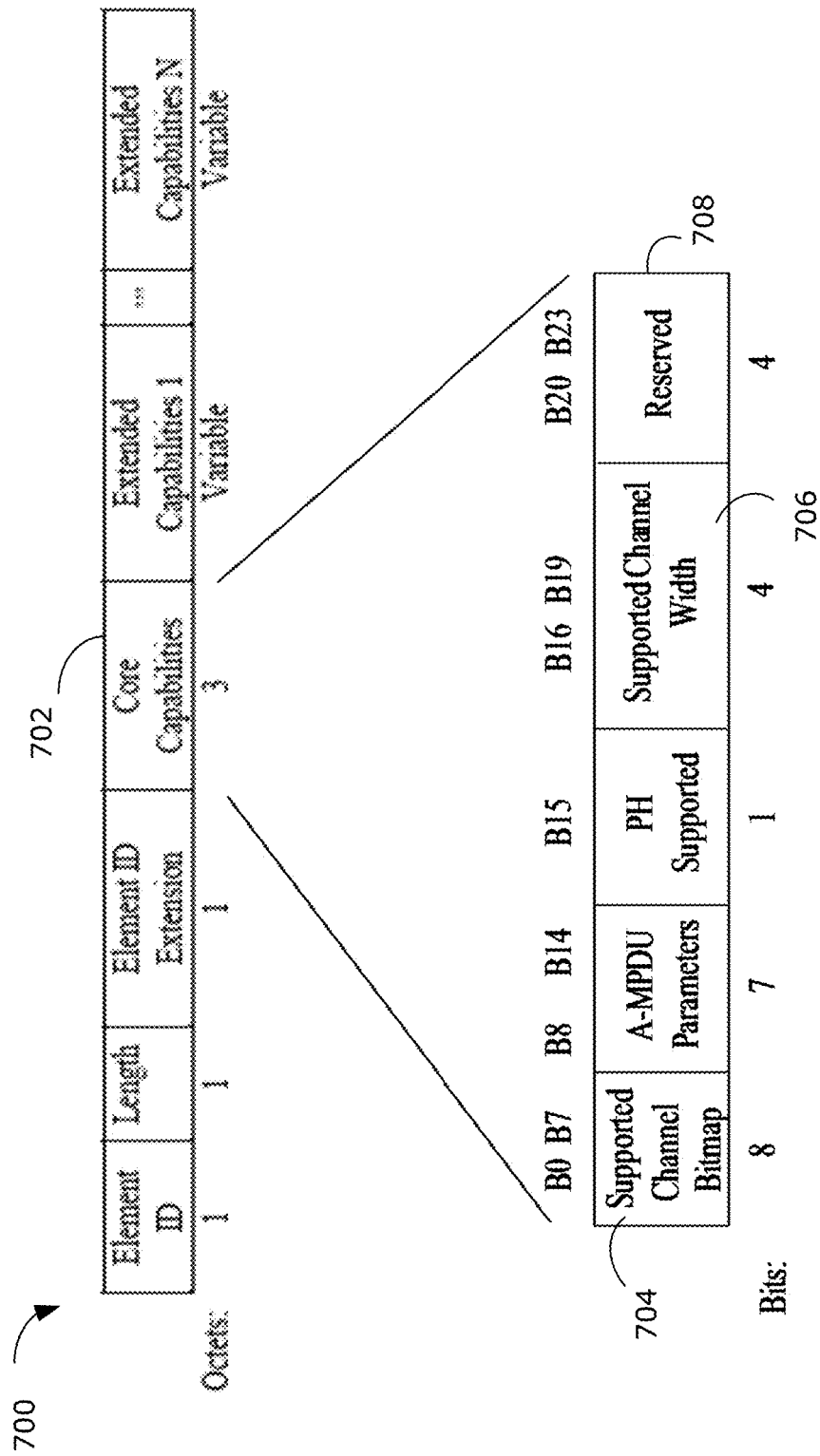
FIG. 7 shows the format of another example Capabilities element implementing a 4 bit Supported Channel Width field.

In another example, shown in FIG. 7, the Capabilities element 700 may include a Core Capabilities field 702 that is 3 octets long, as in the case of the conventional Capabilities element 200 (see FIG. 2). The disclosed Core Capabilities field 702 in this example includes both a Supported Channel Bitmap field 704 as well as a Supported Channel Width field 706. The Supported Channel Bitmap field 704 may be the same as the Supported Channel Bitmap field 204 defined for the conventional Capabilities element 202. The Reserved field 708 may be only 4 bits long, shorter than in the conventional Core Capabilities field 202, so that 4 bits may be used for the Supported Channel Width field 706. The example Capabilities element 700 of FIG. 7 may enable use of the Support Channel Bitmap field 704 to indicate the capability of an AP 102 or STA 104 to operate in each one of a plurality of channels in a regulatory domain indicated by Country element and Operating Class.

Figure 8:
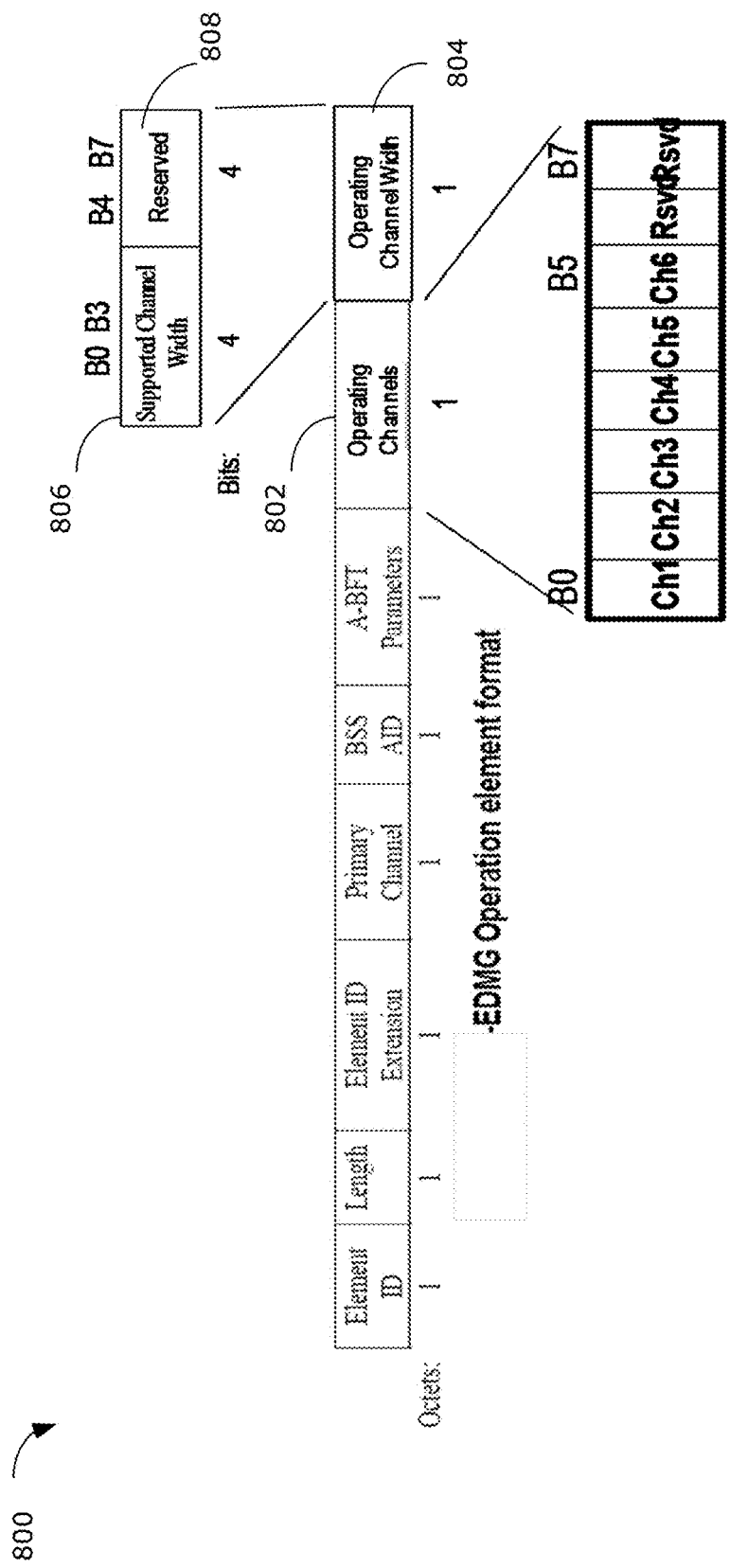
FIG. 8 shows the format of an example Operation element implementing a 4 bit Supported Channel Width field.

FIG. 8 shows an example EDMG Operation element 800 that may be used to transmit a 4 bit Supported Channel Width field, and may be used together with the Capabilities element 600 or 700. In the disclosed Operation element 800, an Operating Channels field 802 and an Operating Channel Width field 804 may be used in place of the BSS Operating Bandwidth field 304 of the conventional Operation element 300 (see FIG. 3A). The Operating Channels field 802 and an Operating Channel Width field 804 may each be only 1 octet long, which together is shorter than the conventional BSS Operating Bandwidth field 304, and thus may provide greater efficiencies. The disclosed Operations Channels field 802 may be similar to the respective Operations Channels field 354 of the Operations element 350 described in U.S. provisional patent application No. 62/444,118. The disclosed Operation element 800 may have the addition of the Operating Channel Width field 804. The Operating Channel Width field 804 may include a Supported Channel Width field 806, which is 4 bits long (e.g., as described above with reference to FIG. 5), as well as a 4 bit Reserved field 808. The inclusion of the Operating Channel Width field 804 may thus enable the Operation element 800 to indicate the channel bonding/aggregation capabilities as well as operating channels and channel width.

In other examples, the Supported Channel Width field may be 5 bits long, as shown in FIG. 9. The example 5 bit Supported Channel Width field conveys the same information as the example 4 bit Supported Channel Width field (see FIG. 5), but in a different format. In the example 5 bit Supported Channel Width field, bit values are set as follows. Bit B0 is set to be "1" if channel bonding is supported; and "0" if channel bonding is not supported. Bits B1B2 are set to be "00" if 2.16 GHz operation is supported; "01" if 2.16 GHz and 4.32 GHz operation is supported; "10" if 2.16 GHz, 4.32 GHz and 6.48 GHz operation is supported; and "11" if 2.16 GHz, 4.32 GHz, 6.48 GHz and 8.64 GHz operation is supported. If bit B0 is set to "0", bits B1 and B2 are ignored. Bit B3 is set to be "1" if channel aggregation is supported; and "0" if channel aggregation is not supported. Bit B4 is set to be "0" if 2.16 GHz+2.16 GHz operation is supported; and "1" if 2.16 GHz+2.16 GHz and 4.32 GHz+ 4.32 GHz operation is supported. If bit B3 is set to "0", bit B4 is ignored.

Figure 10:
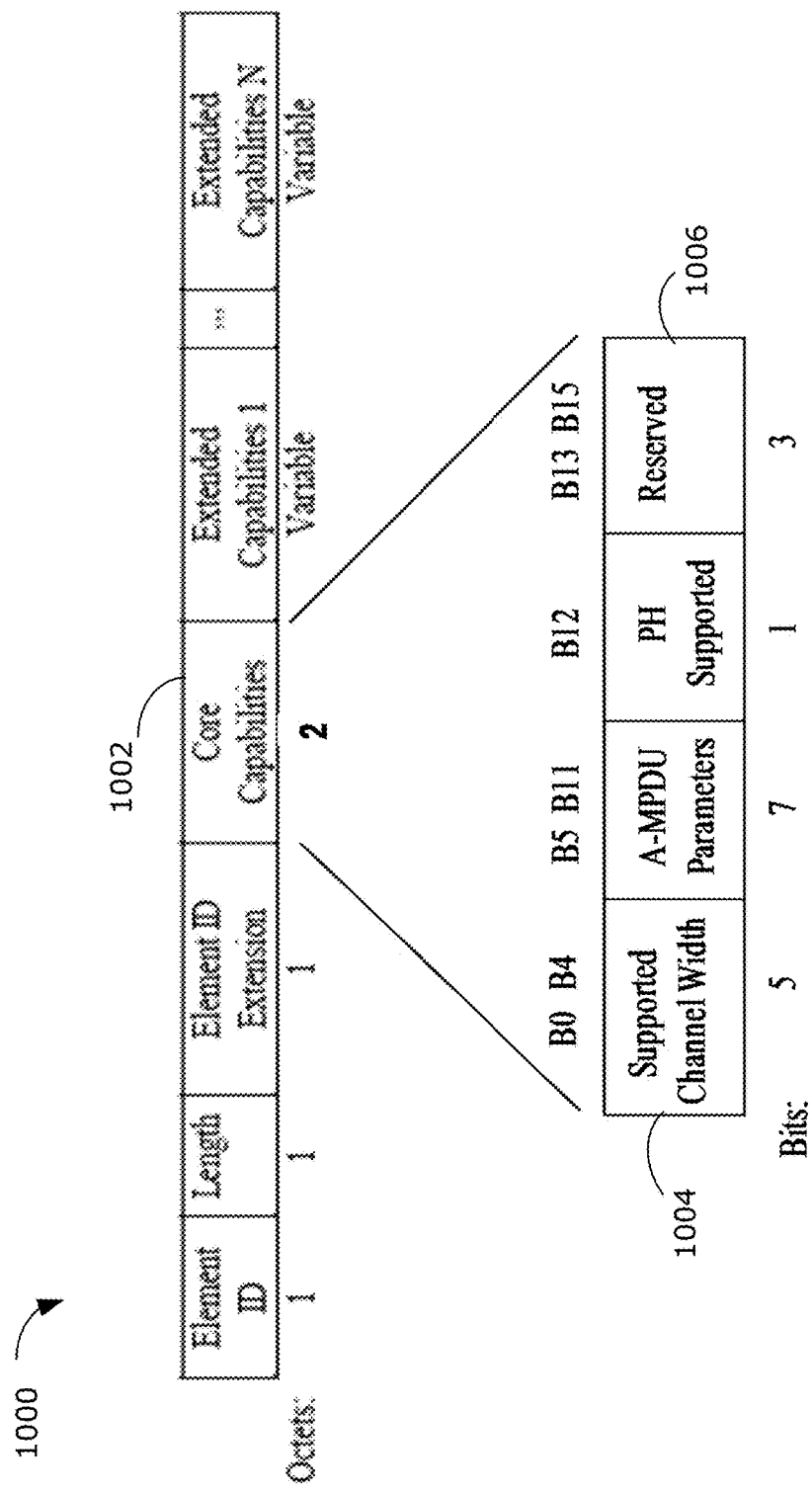
FIG. 10 shows the format of an example Capabilities element implementing a 5 bit Supported Channel Width field.

FIG. 10 illustrates how a 5 bit Support Channel Width field (e.g., as described above) may be implemented in an example EDMG Capabilities element 1000. The Capabilities element 1000 of FIG. 10 may be similar to the Capabilities element 600 of FIG. 6, with the difference that the Support Channel Width field 1004 in the example of FIG. 10 is 5 bits long (e.g., as described with reference to FIG. 9 above), rather than 4 bits long (e.g., as described with reference to FIG. 5 above).

In this example Capabilities element 1000, the Core Capabilities field 1002 is only 2 octets long, which is shorter than in the conventional Capabilities field 200 (see FIG. 2). This shorter field may result in greater efficiencies. The disclosed Core Capabilities field 1002 includes a Supported Channel Width field 1004 in place of the Supported Channels Bitmap 204. The Supported Channel Width field 1004 may be only 5 bits long, which is shorter than the Supported Channels Bitmap 204. Further, the Reserved field 1006 in the disclosed Core Capabilities field 1002 may be only 3 bits long, which is shorter than in the conventional Core Capabilities field 202. The other fields of the disclosed Core Capabilities field 1002 may be the same as in the conventional Core Capabilities field 202. Other fields of the disclosed Capabilities element 1000 may be the same as the conventional Capabilities element 200.

Figure 11:
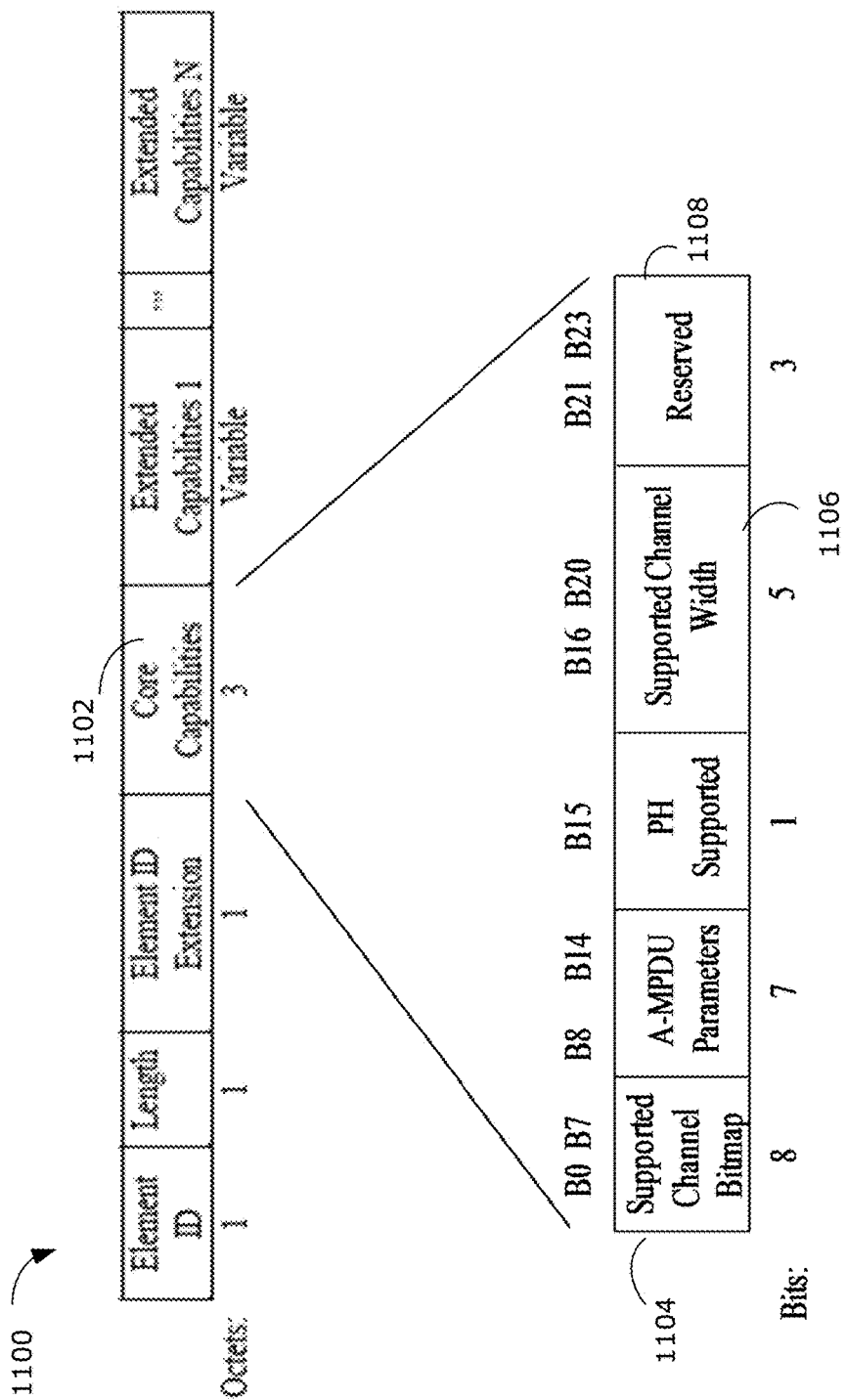
FIG. 11 shows the format of another example Capabilities element implementing a 5 bit Supported Channel Width field.

In another example, shown in FIG. 11, the Capabilities element 1100 may include a Core Capabilities field 1102 that is 3 octets long, as in the case of the conventional Capabilities element 200 (see FIG. 2). The Capabilities element 1100 of FIG. 11 may be similar to the Capabilities element 700 of FIG. 7, with the difference that the Support Channel Width field 1104 in the example of FIG. 11 is 5 bits long (e.g., as described with reference to FIG. 9 above), rather than 4 bits long (e.g., as described with reference to FIG. 5 above).

The disclosed Core Capabilities field 1102 in this example includes both a Supported Channel Bitmap field 1104 as well as a Supported Channel Width field 1106. The Supported Channel Bitmap field 1104 may be the same as the Supported Channel Bitmap field 204 defined for the conventional Capabilities element 202. The Reserved field 1108 may be only 3 bits long, shorter than in the conventional Core Capabilities field 202, so that 5 bits may be used for the Supported Channel Width field 1106. The example Capabilities element 1100 of FIG. 11 may enable use of the Support Channel Bitmap field 1104 to indicate the capability of an AP 102 or STA 104 to operate a subset of channels in a regulatory domain indicated by Country element and Operating Class.

Figure 12:
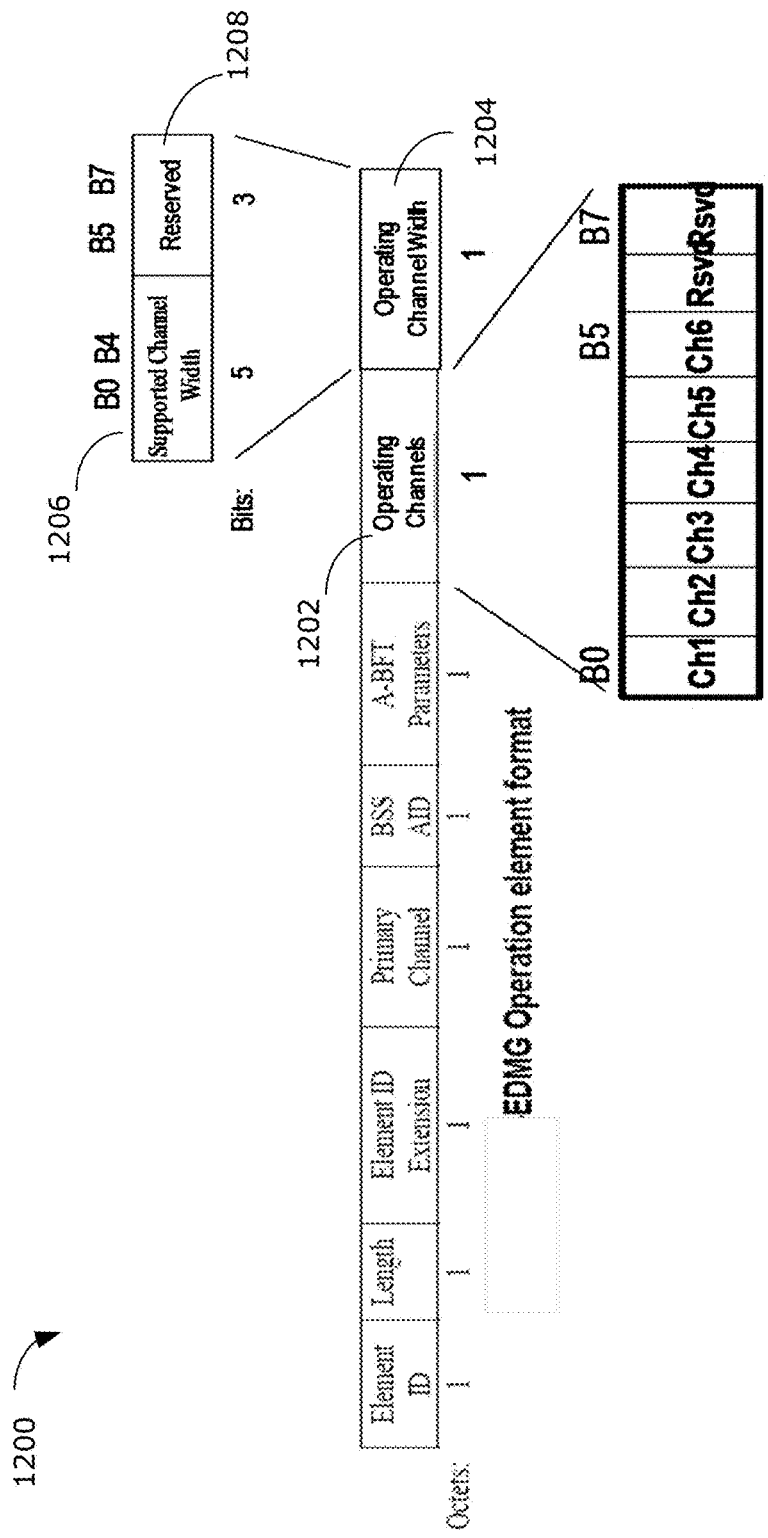
FIG. 12 shows the format of an example Operation element implementing a 5 bit Supported Channel Width field.

FIG. 12 shows an example EDMG Operation element 1200 that may be used to communicate a 5 bit Supported Channel Width field (e.g., as described above) and may be used together with the Capabilities element 1000 or 1100. The Operation element 1200 of FIG. 12 may be similar to the Operation element 800 of FIG. 8, with the difference that the Support Channel Width field 1204 in the example of FIG. 12 is 5 bits long (e.g., as described with reference to FIG. 9 above), rather than 4 bits long (e.g., as described with reference to FIG. 5 above).

In the disclosed Operation element 1200, an Operating Channels field 1202 and an Operating Channel Width field 1204 may be used in place of the BSS Operating Bandwidth field 304 of the conventional Operation element 300 (see FIG. 3A). The Operating Channels field 1202 and an Operating Channel Width field 1204 may each be only 1 octet long, which together is shorter than the conventional BSS Operating Bandwidth field 304, and thus may provide greater efficiencies. The disclosed Operations Channels field 1202 may be similar to the respective Operations Channels field 354 of the Operations element 350 described in U.S. provisional patent application No. 62/444,118. The disclosed Operation element 1200 may have the addition of the Operating Channel Width field 1204. The Operating Channel Width field 1204 may include a Supported Channel Width field 1206, which is 5 bits long (e.g., as described above with reference to FIG. 9), as well as a 3 bit Reserved field 1208. The inclusion of the Operating Channel Width field 1204 may thus enable the Operation element 1200 to indicate the channel bonding/aggregation capabilities as well as operating channels and channel width.

FIG. 13 is a table illustrating another example of how a 4-bit long Supported Channel Width field may be implemented to indicate EDMG capabilities and EDMG operations of an AP 102 or a STA 104. Where the Support Channel Width field is implemented in an EDMG operation element, the Supported Channel Width field may be provided in an Operating Channel Width field. In FIG. 13, an entry of "1" denotes a supported channel width; and "-" denotes a non-supported channel width. The table in FIG. 13 may be similar to the table of FIG. 5, described above. However, in the table of FIG. 13, the entries for "00" value of bits B0 and B1 are reserved and the entries for "01" value of bits B0 and B1 correspond to the entries shown in FIG. 5 for "00" value of bits B0 and B1. In the example shown in FIG. 13, it is not necessary to have entries for indicating channel aggregation support only (i.e., without supporting single channel/channel bonding).

The present disclosure describes examples of a Supported Channel Width field, which may be included in an Operating Channel Width field. The Supported Channel Width field may be 4-bits long or 5-bits long in some examples. Generally, the Operating Channel Width field may include bit positions with bit values that can be selectively set to indicate the capability and operation of a transmit device from among defined options, the defined options including: capability and operation for channel bonding only, capability and operation for carrier aggregation only, and capability and operation for both channel bonding and carrier aggregation.

Where the Supported Channel Width field is 4 bits long, the bit values of 2 bits may be set to indicate a capability and operation of the transmit device from among defined options, the defined options including: the transmit device can perform channel bonding, the transmit device can perform carrier aggregation, and the transmit device can perform both channel bonding and carrier aggregation; and another 2 bits are used together to indicate the respective channel width. The bit values of another 2 bits of the Supported Channel Width field may be set to indicate the respective channel width(s) of the supported channel(s).

Where the Supported Channel Width field is 5 bits long, the bit value of a first bit may be set to indicate whether the transmit device has channel bonding capability and the bit value of a second bit may be separately set to indicate whether the transmit device has carrier aggregation capability. The bit value of another a pair of bits may be set to indicate channel width for channel bonding, and the bit value of a third bit may be set to indicate channel width for carrier aggregation.

The Supported Channel Width field, regardless of length, may be included in the Capabilities element or the Operation element. The Supported Channel Width field may be contained in the Operating Channel Width field, in the Operation element.

The Capabilities element and Operation element described herein may be used by the STA and AP for initial information request/response, for example. In an example operation, a Capabilities element including a Supported Channel Width field (e.g., as described above with reference to FIG. 6, 7, 10 or 12) may be transmitted in a beacon by a STA, to communicate its channel bond and/or carrier aggregation capabilities. The AP may respond with an Operation element to similarly inform the STA of its channels and capabilities.

In the present disclosure, methods for Supported Channel Width indication in an EDMG Capabilities element and an EDMG Operation element are described. Inclusion of a Supported Channel Width field in the Capabilities element and the Operation element may more clearly and explicitly provide information regarding channel bonding and channel aggregation capabilities or operation of a STA or AP, compared to the conventional approach. Using the examples disclosed herein, channel bonding and/or carrier aggregation capabilities or operation may be communicated as part of a Capabilities element or Operation element, respectively, rather than in separate transmissions, which may lead to greater efficiencies.

In an example 1 of the present disclosure, there is provided a method for communicating capabilities for enhanced directional multi-gigabit (EDMG) communications, the method comprising: transmitting, by a transmit device, a capabilities element including a supported channel width field, the supported channel width field including bit positions that indicate whether the transmit device has capabilities for channel bonding or carrier aggregation or both.

In an example 2 of the present disclosure, there is provided the method of example 1, wherein the capabilities element further comprises a supported channel bitmap field for indicating one or more supported channels for EDMG communications.

In an example 3 of the present disclosure, there is provided the method of example 2, wherein the supported channel bitmap field indicates capability of the transmit device to operate, which could be a subset of channels in a regulatory domain.

In an example 4 of the present disclosure, there is provided the method of example 1, wherein the supported channel width field is 4 bits long, wherein 2 bits are used together to indicate whether the transmit device has capabilities for channel bonding or carrier aggregation or both, and another 2 bits are used together to indicate the respective channel width.

In an example 5 of the present disclosure, there is provided the method of example 1, wherein the supported channel width field is 5 bits long, wherein a first bit is used to indicate whether the transmit device has channel bonding capability and a second bit is separately used to indicate whether the transmitting device has carrier aggregation capability, and wherein a pair of bits is used to indicate channel width for channel bonding and a third bit is used to indicate channel width for carrier aggregation.

In an example 6 of the present disclosure, there is provided a method for communicating support of operations for enhanced direction multi-gigabit (EDMG) communications, the method comprising: transmitting, by a transmit device, an operations element including a supported channel width field, the supported channel width field including bit positions that indicate whether the transmit device can perform channel bonding or carrier aggregation or both.

In an example 7 of the present disclosure, there is provided the method of example 6, wherein the operations element further comprises an operating channels field indicating for a plurality of designated channels, which of the designated channels are operating and which are non-operating.

In an example 8 of the present disclosure, there is provided the method of example 6, wherein the supported channel width field is 4 bits long, wherein 2 bits are used together to indicate whether the transmit device can perform channel bonding or carrier aggregation or both, and another 2 bits are used together to indicate the respective channel width.

In an example 9 of the present disclosure, there is provided the method of example 6, wherein the supported channel width field is 5 bits long, wherein a first bit is used to indicate whether the transmit device supports channel bonding operation and a second bit is separately used to indicate whether the transmit device supports carrier aggregation operation, and wherein a pair of bits is used to indicate channel width for channel bonding and a third bit is used to indicate channel width for carrier aggregation.

In an example 10 of the present disclosure, there is provided an apparatus for enhanced directional multi-gigabit (EDMG) communications, the apparatus comprising: a memory; a transceiver for EDMG communications; and a processing unit configured to execute instructions stored in the memory to cause the apparatus to perform the method of any one of examples 1 to 9.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for communicating support of operations for enhanced direction multi-gigabit (EDMG) communications, the method comprising:
transmitting, by a transmit device, an operation element including an operating channel width field, the operating channel width field including bit positions, bit values of the bit positions being set to indicate support of operation of the transmit device from among defined options, the defined options including: the transmit device can perform channel bonding only, the transmit device can perform carrier aggregation only, and the transmit device can perform both channel bonding and carrier aggregation.

2. The method of claim 1, wherein the operating channel width field includes a supported channel width field, the supported channel width field including the bit positions.

3. The method of claim 2, wherein the supported channel width field is 4 bits long, wherein bit values of 2 bits are set to indicate the support of operation of the transmit device from among the defined options, and bit values of another 2 bits are set to indicate the respective channel width of one or more supported channels.

4. The method of claim 2, wherein the supported channel width field is 5 bits long, wherein bit value of a first bit is set to indicate whether the transmit device supports channel bonding operation and bit value of a second bit is separately set to indicate whether the transmit device supports carrier aggregation operation, and wherein bit value of another pair of bits is set to indicate channel width for channel bonding and bit value of a third bit is set to indicate channel width for carrier aggregation.

5. A method for communicating capabilities for enhanced directional multi-gigabit (EDMG) communications, the method comprising:
transmitting, by a transmit device, a capabilities element including a supported channel width field, the supported channel width field including bit positions, bit values of the bit positions being set to indicate a capability of the transmit device from among defined options, the defined options including: the transmit device can perform channel bonding only, the transmit device can perform carrier aggregation only, and the transmit device can perform both channel bonding and carrier aggregation.

6. The method of claim 5, wherein the capabilities element further comprises a supported channel bitmap field for indicating one or more supported channels for EDMG communications.

7. The method of claim 6, wherein the supported channel bitmap field indicates capability of the transmit device to operate in each one of a plurality of channels in a regulatory domain.

8. The method of claim 5, wherein the supported channel width field is 4 bits long, wherein bit values of 2 bits are set to indicate the capability of the transmit device from among the defined options, and bit values of another 2 bits are set to indicate the respective channel width of one or more supported channels.

9. The method of claim 5, wherein the supported channel width field is 5 bits long, wherein bit value of a first bit is set to indicate whether the transmit device has channel bonding capability and bit value of a second bit is separately set to indicate whether the transmit device has carrier aggregation capability, and wherein bit value of another pair of bits is set to indicate channel width for channel bonding and bit value of a third bit is set to indicate channel width for carrier aggregation.

10. An apparatus for enhanced directional multi-gigabit (EDMG) communications, the apparatus comprising:
- a memory;
- a transceiver for EDMG communications; and
- a processing device configured to execute instructions stored in the memory to cause the apparatus to transmit an operation element including an operating channel width field, the operating channel width field including bit positions, bit values of the bit positions being set to indicate support of operations of the transmit device from among defined options, the defined options including: the transmit device can perform channel bonding only, the transmit device can perform carrier aggregation only, and the transmit device can perform both channel bonding and carrier aggregation.

11. The apparatus of claim 10, wherein the operating channel width field includes a supported channel width field, the supported channel width field including the bit positions.

12. The apparatus of claim 11, wherein the supported channel width field is 4 bits long, wherein bit values of 2 bits are set to indicate the support of operation of the transmit device from among the defined options, and bit values of another 2 bits are set to indicate the respective channel width of one or more supported channels.

13. The apparatus of claim 11, wherein the supported channel width field is 5 bits long, wherein bit value of a first bit is set to indicate whether the transmit device supports channel bonding operation and bit value of a second bit is separately set to indicate whether the transmit device supports carrier aggregation operation, and wherein bit value of another pair of bits is set to indicate channel width for channel bonding and bit value of a third bit is set to indicate channel width for carrier aggregation.

14. An apparatus for enhanced directional multi-gigabit (EDMG) communications, the apparatus comprising:
- a memory;
- a transceiver for EDMG communications; and
- a processing device configured to execute instructions stored in the memory to cause the apparatus to transmit a capabilities element including a supported channel width field, the supported channel width field including bit positions, bit values of the bit positions being set to indicate a capability of the transmit device from among defined options, the defined options including: the transmit device can perform channel bonding only, the transmit device can perform carrier aggregation only, and the transmit device can perform both channel bonding and carrier aggregation.

15. The apparatus of claim 14, wherein the capabilities element further comprises a supported channel bitmap field for indicating one or more supported channels for EDMG communications.

16. The apparatus of claim 15, wherein the supported channel bitmap field indicates capability of the transmit device to operate in each one of a plurality of channels in a regulatory domain.

17. The apparatus of claim 14, wherein the supported channel width field is 4 bits long, wherein bit values of 2 bits are set to indicate the capability of the transmit device from among the defined options, and bit values of another 2 bits are set to indicate the respective channel width of one or more supported channels.

18. The apparatus of claim 14, wherein the supported channel width field is 5 bits long, wherein bit value of a first bit is set to indicate whether the transmit device has channel bonding capability and bit value of a second bit is separately set to indicate whether the transmit device has carrier aggregation capability, and wherein bit value of another pair of bits is set to indicate channel width for channel bonding and bit value of a third bit is set to indicate channel width for carrier aggregation.

* * * * *